United States Patent [19]
Ko

[11] Patent Number: 5,416,532
[45] Date of Patent: May 16, 1995

[54] ADAPTIVE VIDEO PEAKING CIRCUITRY USING CROSS-FADERS

[75] Inventor: Jung W. Ko, Lawrenceville, N.J.

[73] Assignee: SamSung Electronics Co., Ltd., Suwon, Rep. of Korea

[21] Appl. No.: 32,258

[22] Filed: Mar. 17, 1993

[51] Int. Cl.$^6$ ............................................. H04N 9/78
[52] U.S. Cl. .................................... 348/665; 348/666; 348/630
[58] Field of Search .................. 358/31, 37, 39, 40, 358/36, 166, 167; H04N 9/78; 348/665, 666, 668, 630, 712, 713, 624

[56] References Cited

U.S. PATENT DOCUMENTS

| | | | |
|---|---|---|---|
| 4,178,609 | 12/1979 | Beutel | 358/31 |
| 4,498,099 | 2/1985 | Pritchard | 358/31 |
| 4,498,100 | 2/1985 | Bunting et al. | 358/31 |
| 4,819,062 | 4/1989 | Donghil et al. | 358/31 |
| 5,097,321 | 3/1992 | Stern | 358/21 R |
| 5,121,209 | 6/1992 | Smith | 358/166 |

Primary Examiner—James J. Groody
Assistant Examiner—Sherrie Hsia
Attorney, Agent, or Firm—Robert E. Bushnell

[57] ABSTRACT

Horizontal and vertical peaking signals are separated from a video signal by combining variously delayed responses to the video signal. A cross-fader combines the separated horizontal and vertical peaking signals in proportions determined by a cross-fader control signal. A correlator responds to ones of the variously delayed responses to the video signal for generating an output signal representative of the relative degrees of vertical and horizontal correlation in the video signal. The correlator output signal addresses a read-only memory that supplies the cross-fader control signal. The adaptively generated peaking signal is suitable for adjustably peaking a luminance component extracted from the video signal, where that video signal is a composite signal also including a chrominance component. The extraction of the luminance component is preferably done on an adaptive basis, generating horizontal and vertical comb filter responses by suitably combining the variously delayed responses to the video signal and, with a further cross-fader, combining the horizontal and vertical comb filter responses in proportions determined by the cross-fader control signal.

43 Claims, 7 Drawing Sheets

ADAPTIVE VIDEO PEAKING CIRCUITRY USING CROSS-FADERS

The invention relates to adaptive video peaking circuitry, as can be used in conjunction with a luma/-chroma separator :For separating luminance signal (or "luma" or "Y") and chrominance signal (or "chroma" or "C") from an NTSC composite video signal.

BACKGROUND OF THE INVENTION

U.S. Pat. No. 4,178,609 issued 11 Dec. 1979 to R. C. Beutel and entitled "COMB FILTER HAVING IMPROVED LUMINANCE RESPONSE" describes an adaptive interline comb filter used for separating luma and chroma from each other in respective responses to a composite video signal. A detector is used with the comb filter to detects the lack of correlation in successive lines of chroma, responsive to which the operation of the comb filter is changed so as to reduce uncancelled chroma in the separated luma.

U.S. Pat. No. 4,498,099 issued 5 Feb. 1985 to D. H. Pritchard and entitled "APPARATUS FOR FRAME-TO-FRAME COMB FILTERING COMPOSITE TV SIGNAL" describes reduction of objectionable double images in the region of moving edges. During times when moving edges are detected, the chroma signal separated by frame combing is lowpass filtered and combined with the luma signal separated by frame combing, thereby to provide a better separated luma signal to replace the separated luma signal obtained simply by frame combing.

U.S. Pat. No. 4,498,100 issued 5 Feb. 1985 to R. M. Bunting and A. A. Acampora and entitled "APPARATUS FOR FRAME-TO-FRAME COMB FILTERING COMPOSITE TV SIGNAL" describes reduction of the color distortions around the periphery of reproduced color images. During times when moving edges are detected, the chroma signal separated by frame combing is added to the luma signal separated by frame combing and the result is bandpass filtered to provide a better separated chroma signal to replace the separated chroma signal obtained simply by frame combing.

U.S. Pat. No. 4,819,062 issued 4 Apr. 1989 to Song Dongil and Kim Byung-Jin and entitled "ADAPTIVE-TYPE LUMINANCE/COLOR SIGNAL SEPARATION CIRCUIT USING THE HORIZONTAL AND VERTICAL CORRELATION IN TELEVISION RECEIVER" describes adaptive comb filtering that avoids the need for frame-to-frame comb filtering. The specification and drawing of U.S. Pat. No. 4,819,062 is incorporated herein by reference. U.S. Pat. No. 4,819,062 describes a first filter means 25 of a type television engineers sometimes refer to as a "highpass vertical comb filter", a second filter means 26 of a type television engineers sometimes refer to as a "highpass horizontal comb filter," a third filter means 27 of a type television engineers sometimes refer to as a "lowpass vertical comb filter," and a fourth filter means 28 of a type television engineers sometimes refer to as a "lowpass horizontal comb filter." Comb filters have alternating passbands and stopbands across the spatial-frequency spectrum. Ideally, the frequency spectrum of a "highpass" comb filter consists of isolated single frequencies recurring on even interval, and such frequency spectrum is not generated by performing a lowpass-to-highpass transform on the frequency spectrum of a "lowpass comb filter" consisting of isolated single frequencies recurring on even interval, including zero frequency. The frequency spectrum of a "highpass" comb filter can be generated by performing a lowpass-to-bandpass transform on the frequency spectrum of a "lowpass comb filter"; however, selecting the carrier frequency to be midway between two tooth frequencies of the "lowpass comb filter." So "highpass comb filters" are sometimes referred to as being "bandpass comb filters," rather than "highpass comb filters." This latter usage is employed in this specification.

U.S. Pat. No. 4,819,062 describes the use of lowpass and bandpass vertical comb filters 25, 27 for separating luminance and chrominance signals from the NTSC composite video signal when that signal is descriptive of an edge as would be encountered during a horizontal sweep through the image field. This patent describes the use of lowpass and bandpass horizontal comb filters 26, 28 for separating luminance and chrominance signals from the NTSC composite video signal when that signal is descriptive of an edge as would be encountered during a vertical sweep through the image field. The determination of which method is to be selected for separating luminance and chrominance signals from the NTSC composite video signal is responsive to a comparison made between the response of a vertical scan edge detector 34 and the response of a horizontal scan edge detector 35. The horizontal scan edge detector 35 determines the correlation of the composite video signal in the horizontal direction, and the vertical scan edge detector 34 determines the correlation of the composite video signal in the vertical direction.

U.S. Pat. No. 4,819,062 further describes the alternative usage of two types of peaking filters for edges. When the luminance and chrominance signals are separated from the NTSC composite video signal using lowpass and bandpass horizontal comb filters 26 and 28, the vertical high frequencies are separated from the response of the bandpass vertical comb filter 25 with a lowpass filter 40. When the luminance and chrominance signals are separated from the NTSC composite video signal using lowpass and bandpass vertical comb filters 25 and 27, the horizontal high frequencies are separated from the response of the lowpass vertical comb filter 27 with a further bandpass filter 50.

U.S. patent application Ser. No. 07/562,907, filed 6 Aug. 1990 by Christopher H. Strolle, Jung-Wan Ko and Raymond A. Schnitzler; entitled "REMOVAL OF THE FOLDING CARRIER AND SIDEBANDS FROM AN UNFOLDED VIDEO SIGNAL"; and assigned to Samsung Electronics Co., Ltd. describes the use of a soft switch or cross-fader for admixing lowpass-vertical-comb-filtered luminance signal with lowpass-horizontal-comb-filtered luminance signal responsive to a comparison made between the response of a horizontal scan edge detector to the luminance signal supplied for adaptive filtering and the response of a vertical scan edge detector to the luminance signal supplied for adaptive filtering. The luminance signal supplied for lowpass vertical comb filtering and lowpass horizontal comb filtering is described as being obtained by unfolding a folded-spectrum luminance signal demodulated from the frequency-modulated luminance carrier of a playback signal retrieved from a VHS video cassette recording.

According to the terminology employed in U.S. patent application Ser. No. 07/562,907 and adopted herein, a horizontal scan encountering an edge between white and black is said to encounter a "horizontal edge". The edge may be a vertical line, but it is called a horizontal edge because it would encountered during a horizontal scan. Similarly, an edge that would be encountered during a vertical scan is called a "vertical edge". The term If "edge" is sometimes referred to in the art as a "discontinuity", "transition", or "detail". A horizontal scan edge detector is an edge detector operative to detect any "horizontal edge"; and a vertical scan edge detector is an edge detector operative to detect any "vertical edge".

SUMMARY OF THE INVENTION

An adaptive luma/chroma separator of the type described in U.S. Pat. No. 4,819,062 is modified in accordance with the invention to use cross-fading rather than selection techniques—i.e., soft switching in place of hard switching—in forming the separated luma signal and the separated chroma signal. This improvement reduces the visibility of the adaptive change in peaking on textured surfaces.

DETAILED DESCRIPTION

Figure 1:
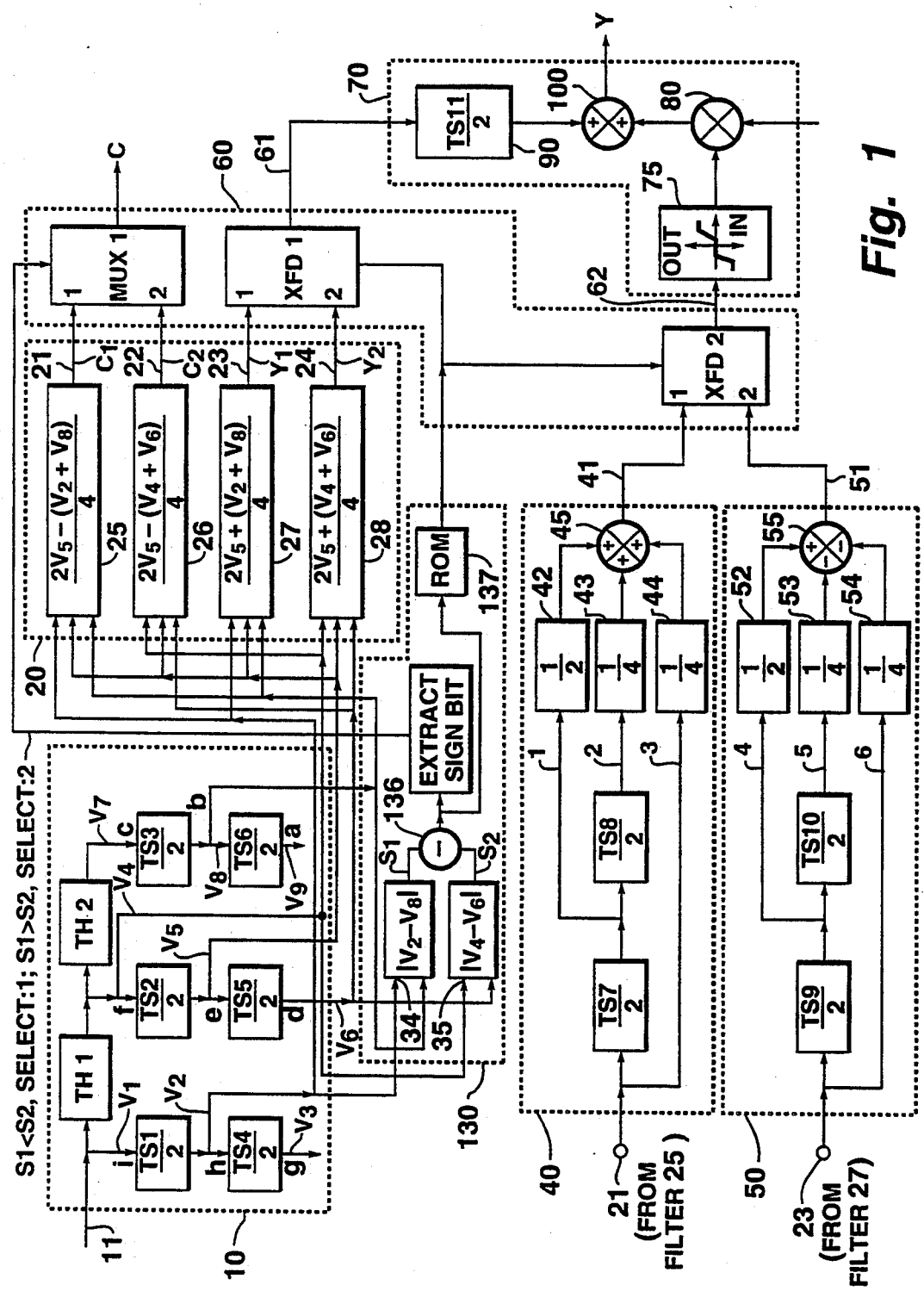
FIG. 1 is a block diagram of a luma/chroma separator embodying the invention.
Figure 4:
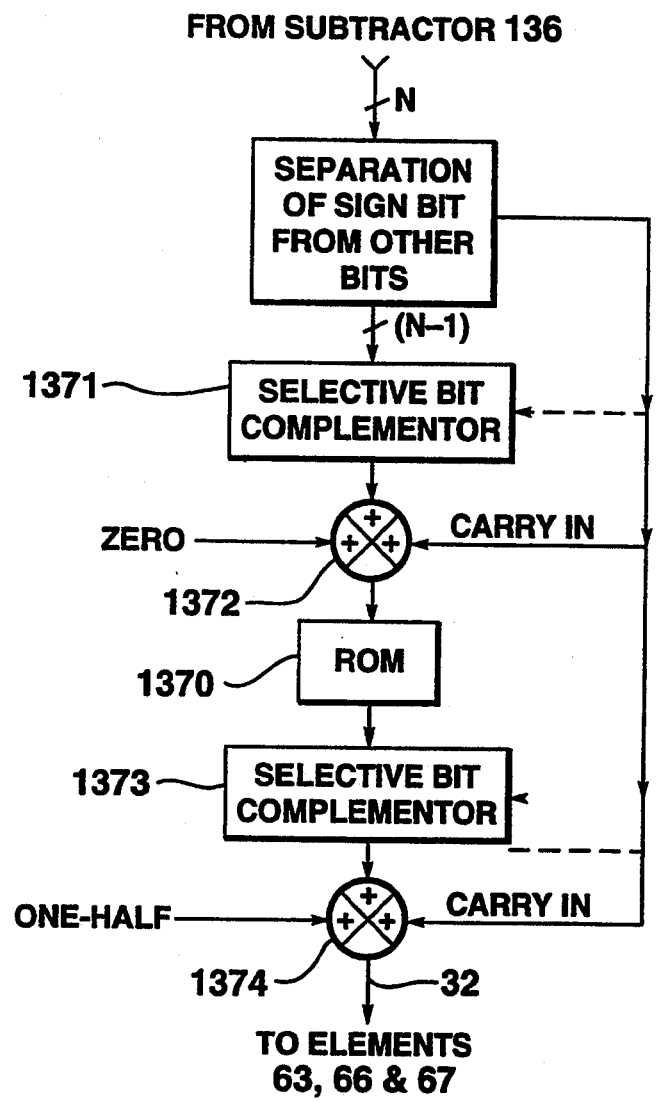
FIG. 4 is a block diagram of circuitry that in an alternative embodiment of the invention replaces the read-only memory in the FIG. 1 control circuitry of U.S. Pat. No. 4,819,602 for the cross-fader circuits with a read-only memory half as large and some digital arithmetic circuitry.

The luma/chroma separator shown in FIG. 1 is similar in many respects to that shown in FIG. 4 of U.S. Pat. No. 4,819,602, but differs in that the multiplexers MUX2 and MUX3 in the data selecting means 60 of FIG. 4 of U.S. Pat. No. 4,819,602, are replaced by cross-faders XFD1 and XFD2 respectively. Further, the selector means 30 of FIG. 4 of U.S. Pat. No. 4,819,602, is replaced in FIG. 1 by control circuitry 130.

The control circuitry 130 is similar in construction to the selector means 30, with the following exceptions. The numerical value comparator 36 is replaced by a subtractor 136, and a read-only memory 137 is included that is addressed by the full difference output signal from the subtractor 136. The ROM 137 generates the control signal supplied to the cross-faders (or "soft switches") XFD1 and XFD2. The sign bit of the subtractor 136 difference output signal is extracted for application to the multiplexer MUX1 in lieu of the numerical value comparator 36 output signal, causing the operation of the multiplexer MUX1 to remain unchanged. The first absolute value operation means 34 functions as a vertical scan edge detector, and the second absolute value operation means 35 functions as a horizontal scan edge detector in the control circuitry 130.

The composite video signal delay means 10 supplies from points therein, to the two-dimensional spatial filter 20, filter digital signals V1, V2, V3, V4, V5, V6, V7, V8, V9 representative of a scanning square array of nine contiguous picture elements or "pixels" i, h, g, f, e, d, c, b, a. A current one of these square arrays can appear in the television image as a top row of left, middle and right pixels c, b and a; a middle row of left, middle and right pixels f, e and d; and a bottom row of left, middle and right pixels i, h and g. Means 25 for generating a first separated chroma response C1 are included in the two-dimensional spatial filter 20, which means 25 in a bandpass vertical comb filtering procedure combine in $(-1):2:(-1)$ ratio the variously delayed composite video signals V2, V5 and V8 descriptive of pixels h, d and b. Means 26 for generating a second separated chroma response C2 are included in the two-dimensional spatial filter 20, which means 26 in a bandpass horizontal comb filtering procedure combine in $(-1):2:(-1)$ ratio the variously delayed composite video signals V4, V5 and V6 descriptive of pixels f, e and d. Means 27 for generating a first separated luma response Y1 are included in the two-dimensional spatial filter 20, which means 27 in a lowpass vertical comb filtering procedure combine in $1:2:(-1)$ ratio the variously delayed composite video signals V2, V5 and V8 descriptive of pixels h, e and b. Means 28 for generating a second separated luma response V2 are included in the two-dimensional spatial filter 20, which means 28 in a lowpass horizontal comb filtering procedure combines in 1:2:1 ratio the variously delayed composite video signals V4, V5 and V6 descriptive of pixels f, e and d.

The crossfader XFD2 and the ROM 137 together provide means for controlling the ratio between the horizontal peaking signal 51 and the vertical peaking signal 41 as components of an adaptively generated peaking signal supplied as output signal from the crossfader XFD2. This ratio is controlled over a range of values including a value in which the ratio between the horizontal peaking signal 51 and the vertical peaking signal 41 as components of the adaptively generated peaking signal is substantially 1:1.

Figure 2:
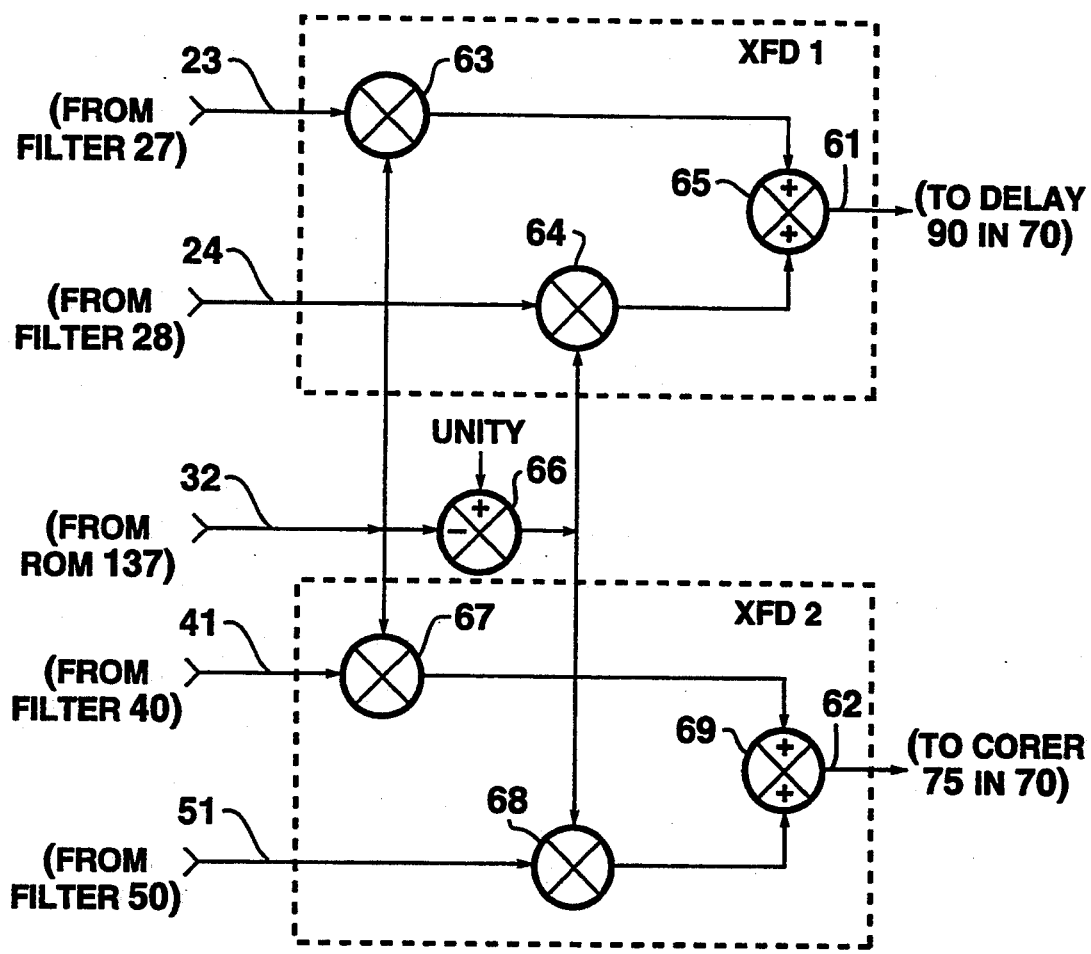
FIG. 2 is a block diagram of details of cross-fader circuits and control circuitry for them, as may be used in the FIG. 1 luma/chroma separator.

FIG. 2 shows the particulars of a representative construction of the cross-faders XFD1 and XFD2 together with their connections to the ROM 137 in the control circuitry 130 as shown in FIG. 1. The cross-fader control signal word received on the bus 32 from the ROM 137 is subtracted from unity, or plus one, in a digital subtractor 66 to develop the one's complement of that cross-fader control signal word, rather than storing that cross-fader control signal word in both non-complemented and complemented form at each addressable location. This halves the size of the required ROM. The cross-fader XFD1 comprises: a first digital multiplier 63 for multiplying the lowpass vertical comb filter 27 response received on the bus 23 with the cross-fader control signal received on the bus 32 from the ROM 137, a second digital multiplier 64 for multiplying the lowpass horizontal comb filter 28 response received on the bus 24 with the one's complement of the cross-fader control signal supplied from the subtractor 66, and a first digital adder 65 for adding together the product signals from the multipliers 63 and 64. The resulting sum signal from the adder 65 is supplied to the delay element 90 in the luminance signal outputting means 70 as shown in FIG. 1. The cross-fader XFD2 comprises: a third digital multiplier 67 for multiplying the output of a lowpass filter 40 i.e., the vertical peaking response received on the bus 41 with the cross-fader control signal received on the bus 32 from the ROM 137, a fourth digital multiplier 68 for multiplying the output of a bandpass filter 50 i.e., the horizontal peaking, response received on the bus 51 with the one's complement of the cross-fader control signal supplied from the subtractor 66, and a second digital adder 69 for adding together the product signals from the multipliers 67 and 68. The resulting sum signal from the adder 69 is supplied to the non-linear circuit 75 in the luminance signal outputting means 70, which non-linear circuit 75 cores noise from the luma-high-frequency peaking signal.

Figure 3:
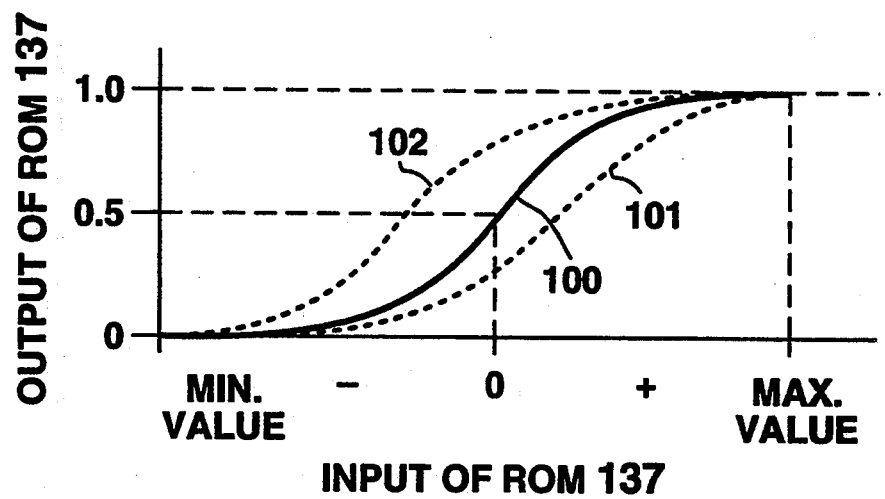
FIG. 3 is a plot of the transfer function described by the look-up table stored in the read-only memory in the FIG. 1 control circuitry of U.S. Pat. No. 4,819,602 for the cross-fader circuits.

FIG. 3 shows the input/output characteristic of the ROM 137, which stores a look-up table for the cross-fader control signal. An address supplied to the ROM 137 from the subtractor 136 having a value between a minimum or negative value and a maximum or positive value produces a look-up table output signal having a value between 0 and 1. The conversion may be in accordance with a smooth transition curve 100, where the cross-fader control signal has a value of one-half for a ROM 137 address that is zero-valued. However, another shape such as curve 101 or curve 102 arrived at experimentally as one which produces the best cancelation of the horizontal and vertical carriers of the characteristic curve may be used instead.

FIG. 4 shows a circuit that under certain conditions can replace the ROM 137 and that uses a ROM 1370 with half as many addressed word-storage locations as the ROM 137. Replacement is possible where the transfer characteristic of cross-fader control signal versus the difference signal from the subtractor 136 is to be symmetrical about the value one-half. The difference signal from the subtractor 136 is separated into a first portion consisting of all the bits except the sign bit, which bits are supplied to a first selective-bit-complementor 1371 for selective bit complementation, and a second portion consisting of the sign bit. The sign bit of the difference signal from the subtractor 136 controls the selective bit complementation by the selective-bit-complementor 1371 and is added as a carry to the output signal from the selective-bit-complementor 1371 in a digital adder 1372. The elements 1371 and 1372 combine to function as an absolute-value circuit, or digital rectifier, for supplying the absolute value of the difference signal from the subtractor 136 to the ROM 1370 as addressing input signal.

Figure 5:
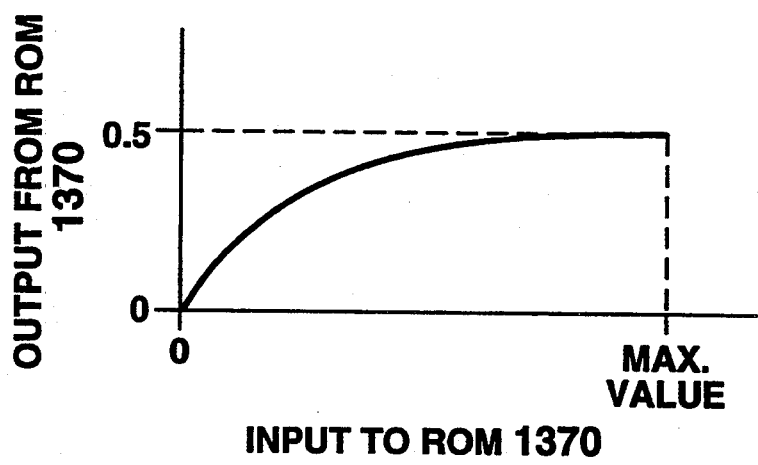
FIG. 5 is a plot of the transfer function described by the look-up table stored in the read-only memory shown in FIG. 4.

FIG. 5 shows the look-up table stored in the ROM 1370. The read-out from the ROM 1370 is supplied to a second selective-bit-complementor 1373 for selective bit complementation. The sign bit of the difference signal from the subtractor 136 controls the selective bit complementation by the selective-bit-complementor 1373 and is supplied as a carry to the addition of the output signal from the selective-bit-complementor 1373 to the value one-half in a digital adder 1374. The sum output signal from the digital adder 1374 provides cross-fader control signal that exhibits a transfer characteristic versus the difference signal from the subtractor 136 that is symmetrical about the value one-half and may by way of example correspond to the curve 100 of FIG. 3.

The term "read-only memory" as used in the claims should be construed broadly enough to include equivalent circuits incorporating reduced storage of signal related to cross-fader control signal, such as that equivalent circuit described with reference to FIGS. 3 and 5.

The transfer characteristic plotted in FIG. 5 can be approximated by an $x^{2n}$ function, and the cross-fader control signal could be generated arithmetically by repeatedly squaring beginning with the difference signal from the subtractor 136, rather than resorting to table look-up from ROM. Generating the cross-fader control signal by these or any other digital arithmetic methods tends to be slow, so that compensating delays have to be introduced into all the signals supplied to the cross-faders XFD1 and XFD2. So using table look-up from ROM is used in the preferred embodiments of the invention.

U.S. patent application Ser. No. 07/562,907 describes and claims vertical scan edge detectors other than that provided by the first absolute value operation means 34. U.S. patent application Ser. No. 07/562,907 also describes and claims horizontal scan edge detectors other than that provided by the second absolute value operation means 35. These other edge detectors were developed by the inventor and his co-workers for being insensitive to remnants of luma spectrum-folding during video tape recording and for better distinguishing against diagonal edge transitions when comb filtering to suppress those remnants from luma. These other edge detectors have value within the context of the improvements in adaptive video peaking circuitry and improvements in luma/chroma separation described in this specification, although suppressing the remnants of luma spectrum-folding during video tape recording are not of particular concern. The value of these other edge detectors is that the two-dimensional spatial filtering they afford involves greater degrees of correlation in the horizontal or vertical direction and accordingly better discriminates against uncorrelated noise affecting edge detection.

Figure 6:
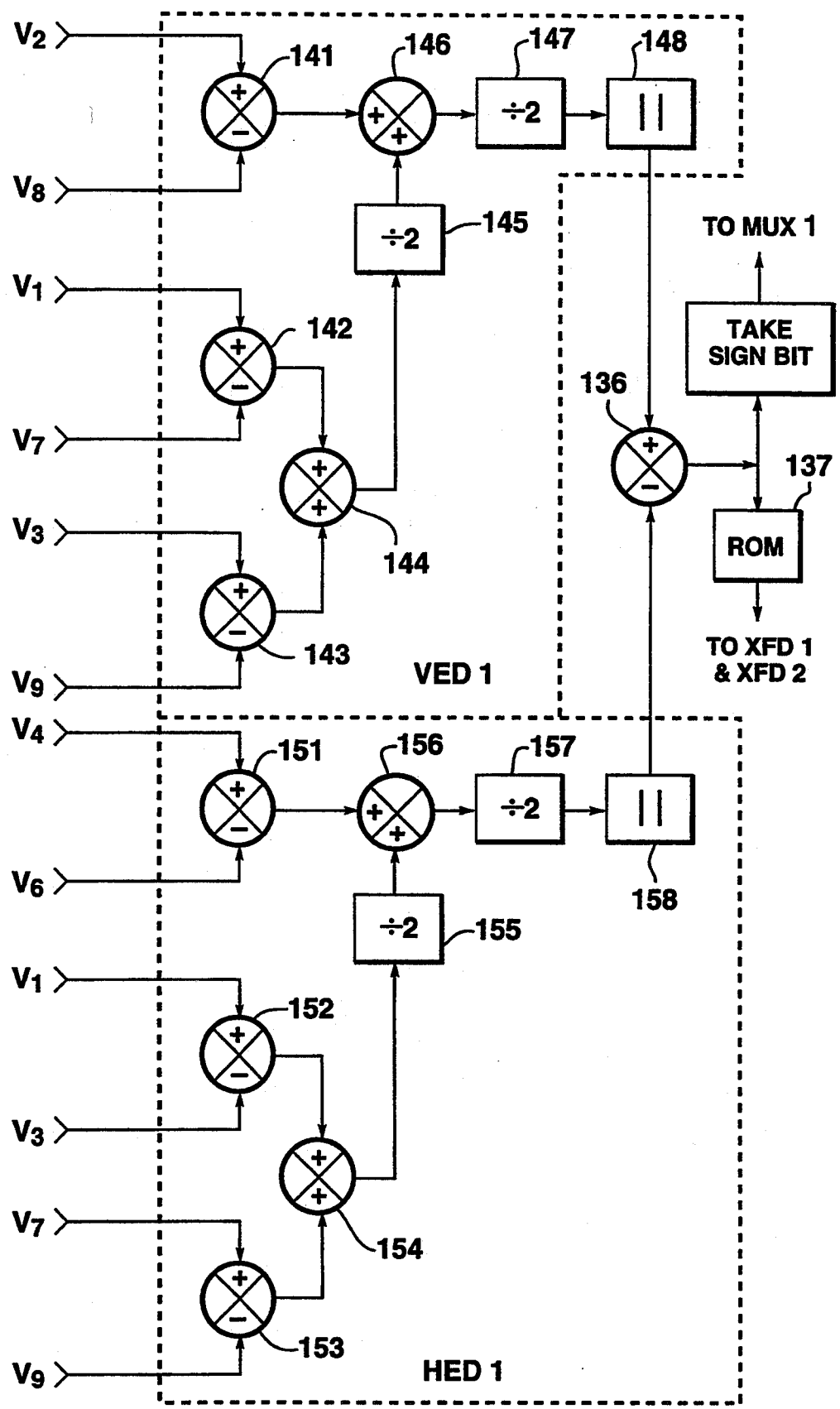
FIGS. 6 and 7 are block diagrams each showing circuitry that can be used to modify or further modify the FIG. 1 luma/chroma separator in still further embodiments of the invention.
Figure 7:
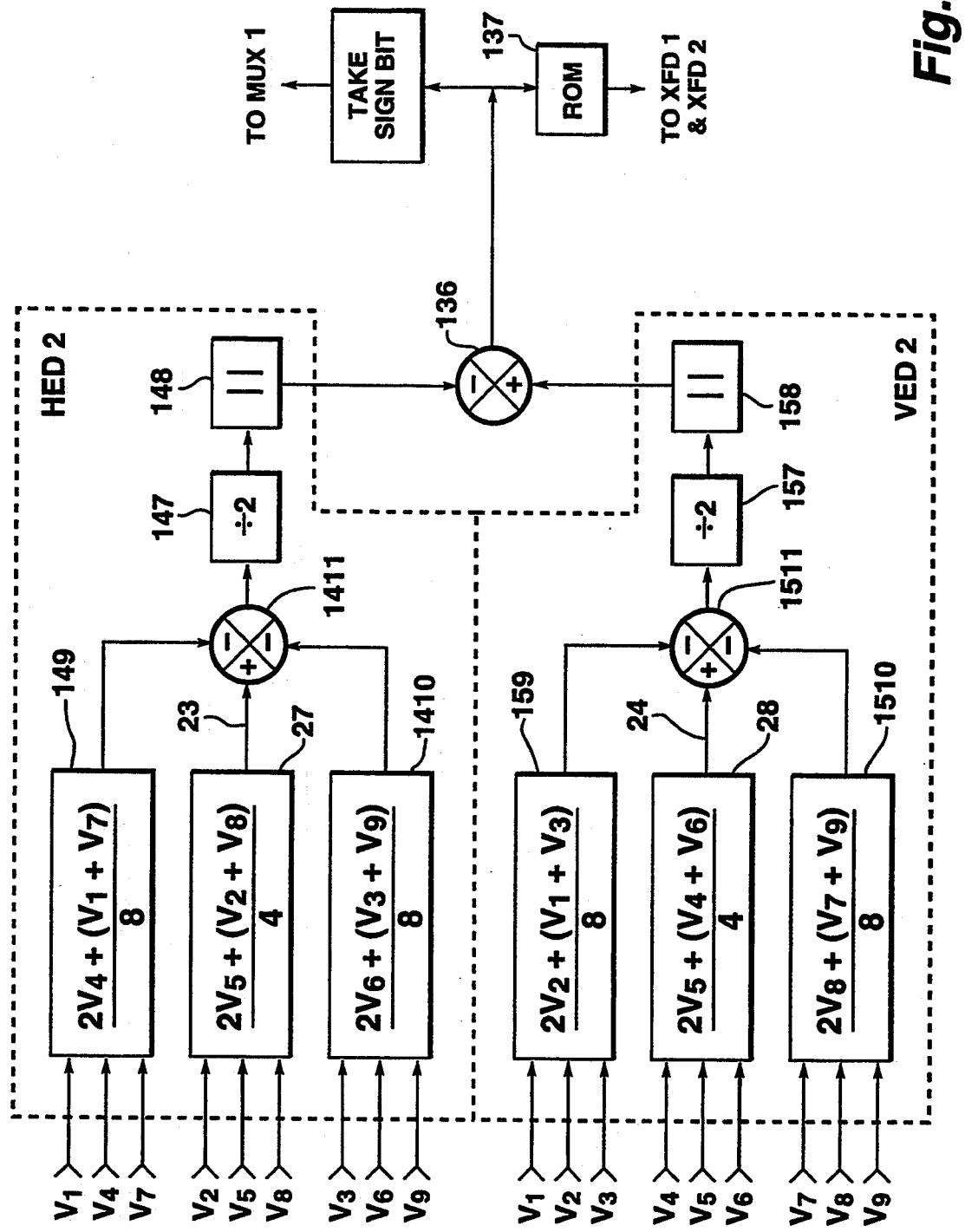

FIGS. 6 and 7 show improved vertical scan edge detectors VED1 and VED2 as described and claimed in U.S. patent application Ser. No. 07/562,907, either of which detectors VED1 and VED2 can replace the simple vertical scan edge detector 34 in the control circuitry 130 of FIG. 1. FIGS. 6 and 7 also show improved horizontal scan edge detectors HED1 and HED2 as described and claimed in U.S. patent application Ser. No. 07/562,907, either of which detectors HED1 and HED2 can replace the simple horizontal scan edge detector 35 in the control circuitry 130 of FIG. 1. The digital signals V1, V2, V3, V4, V5, V6, V7, V8, V9 are drawn from points i, h, g, f, e, d, c., b, a in the composite video signal delay means 10 of FIG. 8.

In FIG. 6 the vertical scan edge detector VED1 includes a digital subtractor 14 1 for subtracting V 8 from V 2, a digital subtractor 142 for subtracting V7 from V1, a digital subtractor 143 for subtracting V9 from V3, a digital adder 144 for summing the difference signals V1−V7 and V3−V9, a wired binary-place-shifter 145 for halving the [(V1−V7)+(V3−V9)] sum from the adder 144, and an digital adder 146 for subtracting the resulting [(V1−V7)+(V3−V9)]/2 term with a difference signal V2−V8 supplied from the subtractor 141. The vertical scan edge detector VED1 further includes a wired binary-place-shifter 147 for halving the [2(V2−V8)+(V1−V7)+(V3−V9)]/2 sum from the adder 146 to generate indications of vertical scan edges, the absolute value of which [2(V2−V8)+(V1−V7)+(V3−V9)]/4 halved sum is supplied to the subtractor 136 as its minuend input signal.

In FIG. 6 the horizontal scan edge detector HED1 includes a digital subtractor 151 for subtracting V6 from V4, a digital subtractor 152 for subtracting V3 from V1, a digital subtractor 153 for subtracting V9 from V7, a digital adder 154 for summing the difference signals V1−V3 and V7−V9, a wired binary-place-shifter 155 for halving the [(V1−V3)+(V7−V9)]sum from the adder 154, and a digital adder 156 for adding the resulting [(V1−V3)+(V7−V9)]/2 term with a difference signal V4−V6 supplied from the subtractor 151. The horizontal scan edge detector H ED 1 further includes a wired binary-place-shifter 157 for halving the [2(V6−V4)+(V1−V3)+(V7−V9)]/2 sum from the adder 156 to generate indications of horizontal scan edges, the absolute value of which [2(V4−V6)+(V1−V3)+(V7−V9)]/4 halved sum is supplied to the subtractor 136 as its subtrahend input signal.

As one skilled in the art of digital design will readily discern, owing to the commutive and associative nature of addition and subtraction, a number of straightforward design variations of the vertical scan edge detector VED1 and of the horizontal scan edge detector HED1 exist, and some of these variants may be particularly advantageous with regard to sharing elements with the filters 25-28. For example, the minuend and subtrahend signals may be reversed as supplied to the subtractor 142 and to the subtractor 143 in one modification of the vertical scan edge detector VED1, and the digital subtractor 146 replaced by a digital adder. In an alternative modification of the vertical scan edge detector VED1, elements 142-143 are replaced by a digital adder for summing V1 and V3, a digital adder for summing V7 and V9, and a digital subtractor for subtracting the (V7+V9) sum from the (VI+V3) sum to obtain a difference signal [(VI+V3)−(V7+V9)] that is equivalent to the [(V1−V7)+(V3−V9)] sum from the adder 144 in the vertical scan edge detector VED1 of FIG. 6. Analogous modifications can be made to the horizontal scan edge detector HED1.

In FIG. 7 the horizontal scan edge detector HED2 includes, in addition to the vertical lowpass filter 27 supplying a response [2V5+(V2+V8)]/4, a vertical lowpass filter 149 supplying a response [2V4+(V1+V7)]/8 and a vertical lowpass filter 1,410 supplying a response [2V6+(V3+V9)]/8, which responses are linearly combined in 1:(−1):(−1) ratio in digital adder/subtractor circuitry 1411. The [4V5+2(V2−V4−V6+V8)−(V1+V3+V7+V9)]/8 response from the circuitry 1411 is supplied to the wired binary-place-shifter 147 for halving. The [4V5+2(V2−V4−V6+V8)−(V1+V3+V7+V9)]/16 binary-place-shifter 147 response provides indications of horizontal scan edges, the absolute value of which indications are determined by the absolute-value circuit 148 and supplied to the subtractor 136 as its subtrahend input signal.

In FIG. 7 the vertical scan edge detector VED2 includes in addition to the horizontal lowpass filter 28 supplying a response [2V5+(V4+V6)]/4, a horizontal lowpass filter 159 supplying a response [2V2+(V1+V3)]/8 and a horizontal lowpass filter 1510 supplying a response [2V8+(V7+V9)]/8, which responses are linearly combined in 1:(−1):(−1) ratio in digital adder/subtractor circuitry 1511. The [4V5+2(−V2+V4+V6−V8)−(V1+V3+V7+V9)]/8 response from the circuitry 1511 is supplied to the wired binary-place-shifter 157 for halving. The [4V5+2(−V2+V4+V6−V8)−(V1+V3+V7+V9)]/16 binary-place-shifter 157 response provides indications of vertical scan edges, the absolute value of which indications are determined by the absolute-value circuit 158 and supplied to the subtractor 136 as its minuend input signal.

As one skilled in the art of digital design will readily discern, owing to the commutive and associative nature of addition and subtraction, a number of straightforward design variations of the vertical scan edge detector VED2 and of the horizontal scan edge detector HED2 exist. In other variants of the circuitry in FIGS. 6 and 7, both the wired binary-place-shifters 147 and 157 can be replaced with a wired place shift after the subtractor 136.

Figure 8:
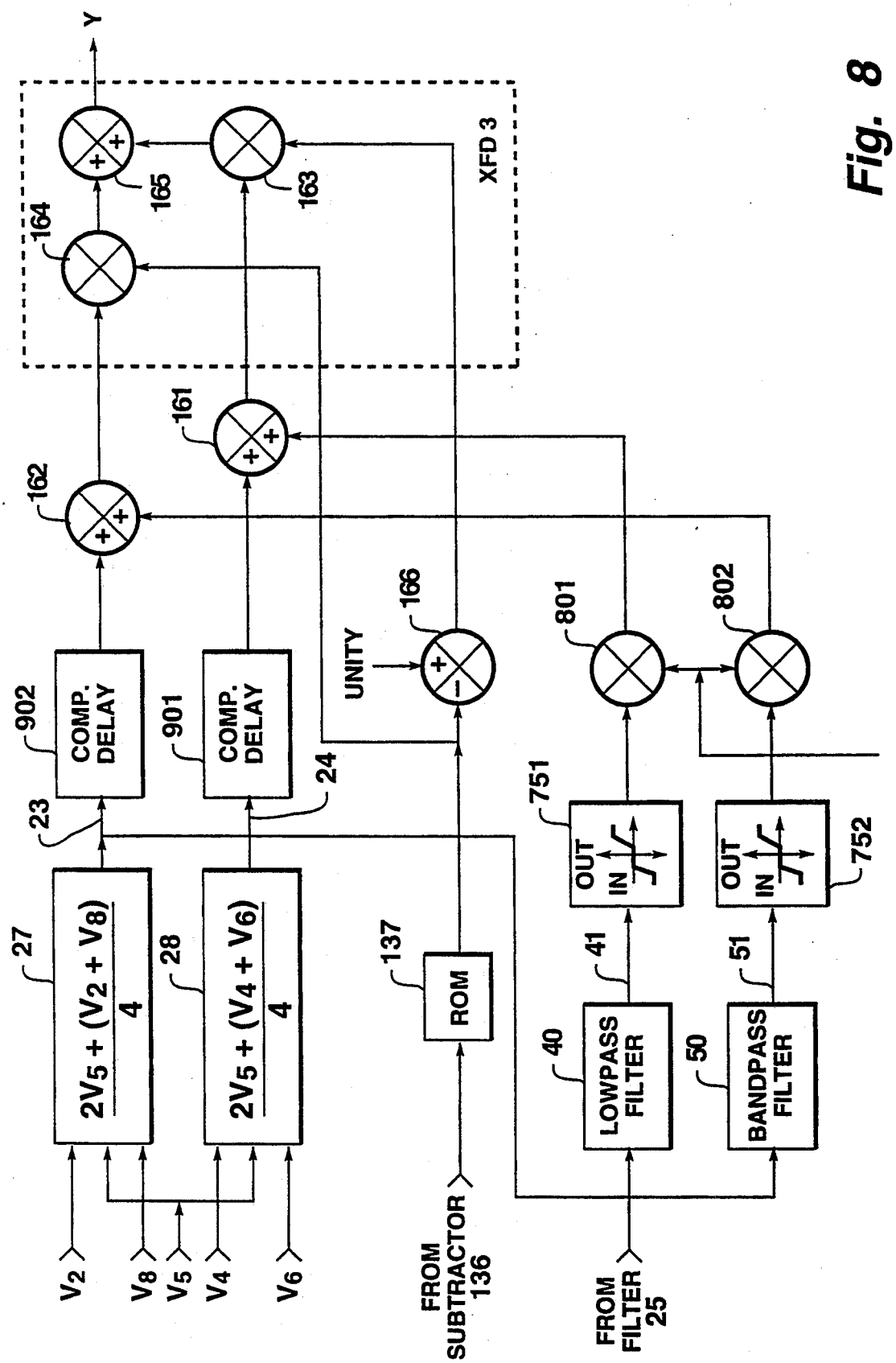
FIG. 8 is a block diagram of a modification that can be made to the FIG. 1 luma/chroma separator to provide an alternative embodiment of the invention.

FIG. 8 shows a modification that can be made to the FIG. 1 luma/chroma separator, which modification replaces the two cross-faders XFD1 and XFD2 with a single cross-fader XFD3 in order to get an overall saving of one digital multiplier. The vertical luma-high-frequency peaking response supplied by the lowpass filter 40 to the bus 41 and the horizontal luma-high-frequency peaking response supplied by the bandpass filter 50 to the bus 51 are not supplied to the cross-fader XFD2 for selection between them for application to the non-linear circuit 75 for noise-coring. Instead, the responses on the lines 41 and 51 are supplied to respective non-linear circuits 751 and 752 for noise-coring, to generate respective multiplicand signals for the digital multipliers 801 and 802. The digital multipliers 801 and 802 receive the same multiplier signal, which determines the amount of luma-high-frequency peaking. Two digital multipliers 801 and 802 are used to determine the amount of luma-high-frequency peaking in the FIG. 8 modification, rather than just a single digital multiplier 80 as in the FIG. 1 luma/chroma separator; and the digital multipliers 63 and 64 associated with the cross-fader XFD1 are replaced by digital multipliers 163 and 164 within the crossfader XFD3. However, the digital multipliers 67 and 68 associated with the crossfader XFD2 are dispensed with, to provide the overall saving of one digital multiplier.

A digital adder 161 sums the noise-cored, gain-adjusted vertical luma-high-frequency peaking response from the digital multiplier 801 with the delayed response of a compensating delay element 901 to the filter 28 response on the bus 24. Another digital adder 162 sums the noise-cored, gain-adjusted horizontal luma-high-frequency peaking response from the digital multiplier 802 with the delayed response of a compensating delay element 902 to the filter 27 response on the bus 23. The sum signals from the adders 161 and 162 are supplied to the crossfader XFD3 for application to the digital multipliers 163 and 164, respectively, therewithin. The digital multiplier 164 multiplies the sum signal from the adder 162 by the cross-fader control signal read from the ROM 137, and the digital multiplier 163 multiplies the sum signal from the adder 161 by the one's complement of that cross-fader control signal as supplied from the digital subtractor 166. The cross-fader XFD3 further includes a digital adder 165 for summing the product signals from the digital multipliers 163 and 164, to generate the peaked luminance response Y.

Figure 9:
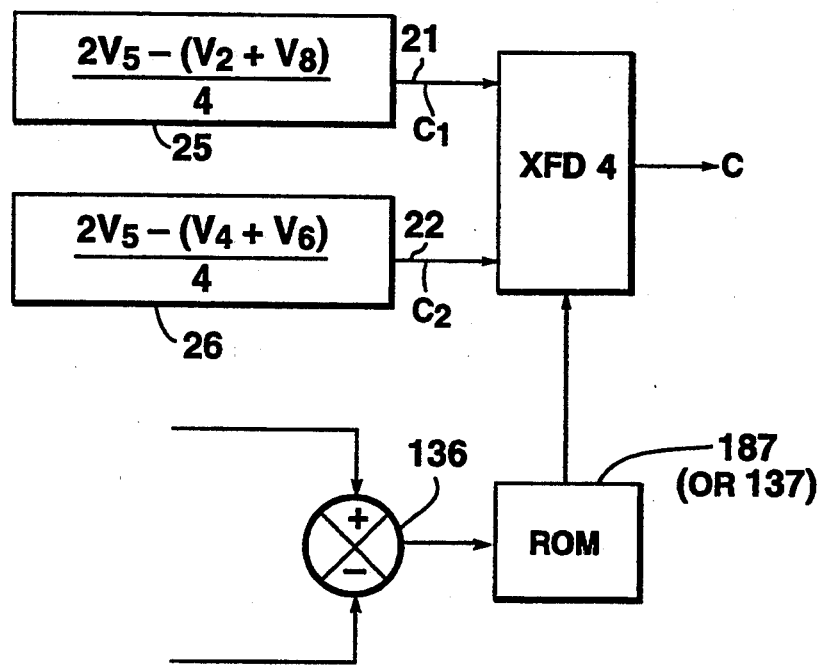
FIG. 9 is a block diagram of another modification that can be made to the FIG. 1 luma/chroma separator, in which modification a cross-fader circuit is included in the adaptive chroma filtering.

FIG. 9 shows a further modification that can easily be made to the luma/chroma separator, as shown in FIG. 1 or modified as described above, when cross-fader circuitry is used for adaptive luma filtering. In FIG. 9 the multiplexer MUX1 is replaced by a crossfader XFD4, which receives its cross-fader control signal from a read-only memory 187 addressed by the difference signal supplied by the subtractor 136. Similarly, the read-only-memory 187 as shown in FIG. 9 can actually be the same read-only-memory 137 as shown in FIG. 1. In FIG. 1, the multiplexer MUX1 provides a "hard switch" function in response to the sign bit of the difference signal from the subtractor 136, supplied as an output signal from the circuitry 130. The multiplexer MUX1 responds to that sign bit indicating that the horizontal scan edge detection response $S_2$ exceeds the vertical scan edge detection response $S_1$ for generating a separated chroma response C in sole response to first separated chroma response $C_1$ from the bandpass vertical comb filter 25, and the multiplexer MUX1 responds to that sign bit indicating the vertical scan edge detection response $S_1$ exceeds the horizontal scan edge detection response $S_2$ for generating a separated chroma response C in sole response to the second separated chroma response $C_2$ from the bandpass horizontal comb filter 26. The cross-fader XFD4 replaces the "hard switch" function of the multiplexer MUX1 with a "soft switch" function, provided in response to the output signal from the ROM 187, or the ROM 137 of the circuitry 130, as shown in FIG. 1, in response to the difference signal from the subtractor 136, applied to the ROM 187 as an address input. The cross-fader XFD4 responds to the ROM 187 read-out indicating the horizontal scan edge detection response $S_2$ exceeds the vertical scan edge detection response $S_1$ for generating separated chroma response C in greater response to the first separated chroma response $C_1$ than to the second separated chroma response $C_2$. The cross-fader XF4 responds to the ROM 137 readout indicating the vertical scan edge detection response $S_1$ exceeds the horizontal scan edge detection response $S_2$ for generating separated chroma response C in greater response to the second separated chroma response $C_2$ than to the first separated chroma response $C_1$. Since the chroma signal C from the multiplexer MUX1 in the FIG. 1 luma/chroma separator is subsequently synchronously detected to detect color-difference signals, and since the detector response is customarily low-pass filtered, switching transients in the separated chroma signal C are less likely to generate noticable artifacts in a television picture than switching transients in the separated luma signal Y. However, soft switching or cross-fading between the C1 chroma separated by vertical bandpass filtering and the C2 chroma separated by horizontal bandpass filtering can still be beneficial enough to justify the cost of two digital multipliers. In the temporal domain, the noise in the C1 chroma separated by vertical bandpass filtering is quite uncorrelated with the noise in the C2 chroma separated by horizontal bandpass filtering, but chroma itself is quite correlated. So, some improvement in chroma signal-to-noise ratio can be achieved in low-detail areas of the television image by combining the C1 and C2 signals in the output chroma signal C.

Figure 10:
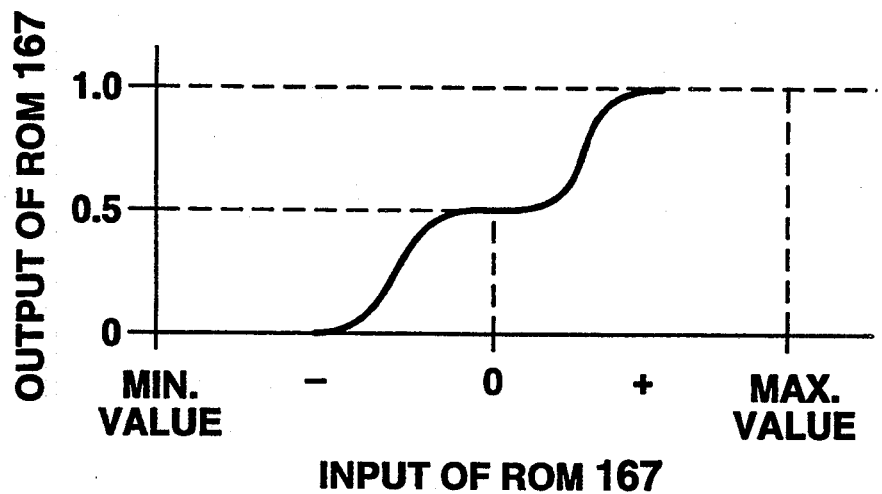
FIG. 10 is a plot of the transfer function described by the look-up table stored in the read-only memory shown in FIG. 9.

FIG. 10 plots a transfer function that the look-up table entries in the read-only memory 187 can follow. When the difference signal from the subtractor 136 has appreciable value, indicative of the likelihood of cross-luminance appearing in the output chroma signal C, the read-out from the ROM 187 causes the cross-fader XFD4 to select for the output chroma signal C the same one of the C1 and C2 signals that would have been selected by the multiplexer MUX1 in the FIG. 4 luma/chroma separator of FIG. 4 of U.S. Pat. No. 4,819,602. When the difference signal from the subtractor 136 has negligible value, indicative there is little or no likelihood of cross-luminance appearing in the output chroma signal (52, the read-out from the ROM 187 causes the cross-fader XFD4 to average the C1 and C2 signals to generate the output chroma signal C in the FIG. 9 modification of the FIG. 1 luma/chroma separator. There is the possibility that the look-up table stored in the ROM 137 can provide for a transfer function suitable for use in all the cross faders XFD1, XFD2 and XFD4 (or in both the cross faders XFD3 and XFD4, if the FIG. 1 luma/chroma separator is modified per FIG. 8).

In the claims which follow, the definite article "the" is not used to refer back to an antecedent. When it is intended to refer back to a previously claimed element or feature thereof, the word "said" is used, rather than "the".

What is claimed is:

1. Adaptive video peaking circuitry for generating an adaptively generated peaking signal responsive to a video signal, said video signal describing line-by-line scanning of successive image fields and exhibiting changing relative degrees of horizontal correlation and vertical correlation of a picture element currently being scanned and its locally surrounding picture elements, said adaptive video peaking circuitry comprising:

delay means including a plurality of delay elements connected for variously delaying said video signal, for providing variously delayed video signals generally being descriptive of the scanning of a square array of nine contiguous pixels within a currently scanned image field, said square array having top and middle and bottom rows of pixels arrayed along successive scan lines of said currently scanned image field, said square array having left and middle and right columns of pixels arrayed transversely to successive scan lines of said currently scanned image field;

means responsive to ones of said variously delayed video signals for separating a horizontal peaking signal;

means responsive to ones of said variously delayed video signals for separating a vertical peaking signal;

correlator means responding to ones of said variously delayed video signals for generating an output signal representative of the relative degrees of said vertical correlation and said horizontal correlation within said square array of nine contiguous pixels; and means linearly and constructively combining said horizontal peaking signal and said vertical peaking signal for generating said adaptively generated peaking signal, said means for generating said adaptively generated peaking signal including:
means for controlling, over a range of values more than two, responsive to said output signal from said correlator means, the ratio between said horizontal peaking signal and said vertical peaking signal as components of said adaptively generated peaking signal, said range of values including a value in which the ratio between said horizontal peaking signal and said vertical peaking signal as components of said adaptively generated peaking signal is substantially 1:1.

2. Adaptive video peaking circuitry as set forth in claim 1, wherein said means responsive to ones of said variously delayed video signals for separating a horizontal peaking signal includes:
means, combining ones of said variously delayed video signals descriptive of pixels in said middle column of said square array of nine contiguous pixels, for generating a lowpass vertical comb filter response; and
band-pass peaking filter means responding to said lowpass vertical comb filter response for separating said horizontal peaking signal therefrom.

3. Adaptive video peaking circuitry as set forth in claim 1, wherein said means responsive to ones of said variously delayed video signals for separating a vertical peaking signal includes:
means, combining different ones of said variously delayed video signals descriptive of pixels in said middle column of said square array of nine contiguous pixels, for generating a bandpass vertical comb filter response; and
low-pass peaking filter means responding to said bandpass vertical comb filter response for separating said vertical peaking signal therefrom.

4. Adaptive video peaking circuitry as set forth in claim 1, wherein said means for controlling the ratio between said horizontal peaking signal and said vertical peaking signal comprises:
a cross-fader for combining said horizontal peaking signal and said vertical peaking signal in proportions determined in accordance with a control signal and thereby generating said adaptively generated peaking signal; and wherein said means for generating said adaptively generated peaking signal further includes:
means, including a read-only memory for storing a look-up table addressed by said output signal from said correlator means, for generating said control signal.

5. Adaptive video peaking circuitry as set forth in claim 4, wherein said correlator means comprises:
a horizontal scan edge detector, determining the absolute value of differences between said variously delayed video signals descriptive of left and right pixels in said middle row of said square array of nine contiguous pixels, for generating a horizontal scan edge detection response;
a vertical scan edge detector, determining the absolute value of differences between said variously delayed video signals descriptive of top and bottom pixels in said middle column of said square array of nine contiguous pixels, for generating a vertical scan edge detection response; and
means for generating said output signal from said correlator means as a differential response to the absolute values of said horizontal scan edge detection response and of said vertical scan edge detection response.

6. Adaptive video peaking circuitry as set forth in claim 4, wherein the pixels in the top row of said square array are identified from left to right as c, b and a, respectively; the pixels in the middle row of said square array are identified from left to right as f, e and d, respectively; and the pixels in the bottom row of said square array are identified from left to right as i, h and g, respectively; and wherein said correlator means comprises:
a horizontal scan edge detector combining signals at points a, c, d, f, g and i with weights in $(-\frac{1}{4}):(\frac{1}{4}):(-\frac{1}{4}):(\frac{1}{4}):(-\frac{1}{4}):(\frac{1}{4})$ ratio for generating a horizontal scan edge detection response;
a vertical scan edge detector combining signals at points a, b, c, g, h and i with weights in $(-\frac{1}{4}):(-\frac{1}{4}):(-\frac{1}{4}):(\frac{1}{4}):(\frac{1}{4}):(\frac{1}{4})$ ratio for generating a vertical scan edge detection response; and
means for generating said output signal from said correlator means as a differential response to the absolute values of said horizontal scan edge detection response and of said vertical scan edge detection response.

7. Adaptive video peaking circuitry as set forth in claim 5, wherein the pixels in the top row of said square array are identified from left to right as c, b and a, respectively; the pixels in the middle row of said square array are identified from left to right as f, e and d, respectively; and the pixels in the bottom row of said square array are identified from left to right as i, h and g, respectively; and wherein said correlator means comprises:
a horizontal scan edge detector combining signals at points a, b, c, d, e, f, g, h and i with weights in $(-1/16):(\frac{1}{8}):(-1/16):(-\frac{1}{8}):(\frac{1}{4}):(-\frac{1}{8}):(-1/16):(\frac{1}{8}):(-1/16)$ ratio for generating a horizontal scan edge detection response;
a vertical scan edge detector combining signals at point a, b, c, d, e, f, g, h and i with weights in $(-1/16):(-\frac{1}{8}):(-1/16):(\frac{1}{8}):(\frac{1}{4}):(\frac{1}{8}):(-1/16):(-\frac{1}{8}):(-1/16)$ ratio for generating a vertical scan edge detection response; and
means for generating said output signal from said correlator means as a differential response to the absolute values of said horizontal scan edge detection response and of said vertical scan edge detection response.

8. Adaptive video peaking circuitry as set forth in claim 4 wherein said cross-fader comprises:
first and second digital multipliers receptive of separate ones of said horizontal and vertical peaking signals as respective multiplicand signals, said first digital multiplier being supplied said control signal as read from said read-only memory as a respective multiplier signal and supplying a respective product signal, said second digital multiplier supplying a respective product signal;
means for supplying a one's complement response to said control signal as read from said read-only memory as a respective multiplier signal to said second digital multiplier; and
means linearly and constructively combining the respective product signals of said first and second digital multipliers for generating said adaptively generated peaking signal.

9. Adaptive video peaking circuitry as set forth in claim 8 in combination with:

means responsive to ones of said variously delayed video signals for generating a signal to be adjustably peaked;

means for coring noise from said adaptively generated peaking signal to generate a cored peaking signal;

means for adjustably varying the amplitude of said cored peaking signal to generate an adjusted-amplitude cored peaking signal; and means for combining said adjusted-amplitude cored peaking signal with said signal to be adjustably peaked.

10. An adaptive luma/chroma separator for separating luminance and chrominance components of a composite video signal, said composite video signal describing line by line scanning of successive fields and exhibiting changing relative degrees of horizontal correlation and vertical correlation of a picture element currently being scanned and its locally surrounding picture elements, said adaptive luma/chroma separator providing adaptive luminance peaking and comprising:

delay means including a plurality of delay elements connected for variously delaying said composite video signal, for providing variously delayed composite video signals generally being descriptive of the scanning of a square array of nine contiguous pixels within a currently scanned image field, said square array having top and middle and bottom rows of pixels arrayed along successive scan lines of said currently scanned image field, said square array having left and middle and right columns of pixels arrayed transversely to successive scan lines of said currently scanned image field;

means, combining in a bandpass vertical comb filtering procedure ones of said variously delayed composite video signals descriptive of pixels in said middle column of said square array of nine contiguous pixels, for generating a first separated chroma response;

means, combining in a bandpass horizontal comb filtering procedure ones of said variously delayed composite video signals descriptive of pixels in said middle row of said square array of nine contiguous pixels, for generating a second separated chroma response;

means, combining in a lowpass vertical comb filtering procedure ones of said variously delayed composite video signals descriptive of pixels in said middle column of said square array of nine contiguous pixels, for generating a first separated luma response;

means, combining in a lowpass horizontal comb filtering procedure ones of said variously delayed composite video signals descriptive of pixels in said middle, row of said square array of nine contiguous pixels, for generating a second separated luma response;

low-pass peaking filter means responding to said first separated chroma response for separating only a vertical peaking signal;

band-pass peaking filter means responding to said first separated luma response for separating only a horizontal peaking signal;

correlator means responding to ones of said variously delayed composite video signals, for generating output signals representative of the relative degrees of said vertical correlation and said horizontal correlation within said square array of nine contiguous pixels;

means, combining said first and second separated chroma responses in accordance with a first of said output signals from said correlator means, for generating a third separated chroma response for ultimate use; and means, combining said first separated luma response, said second separated luma response, said horizontal peaking signal and said vertical peaking signal, for generating a third separated luma response for ultimate use, said means for generating a third separated luma response including:

means for controlling, over a range of values more than two, responsive to a second of said output signals from said correlator means, the ratio between said first separated luma response and said second separated luma response as components of said third separated luma response, said range of values including a value for which the ratio between said first separated luma response and said second separated luma response as components of said third separated luma response is substantially 1:1; and means for controlling over a range of values more than two, responsive to a said second of said output signals from said correlator means, the ratio between said horizontal peaking signal and said vertical peaking signal as components of said third separated luma response, said range of values including a value for which the ratio between said horizontal peaking signal and said vertical peaking signal as components of said third separated luma response is substantially 1:1.

11. An adaptive luma/chroma separator as set forth in claim 10, wherein said means for controlling the ratio between said first separated luma response and said second separated luma response as components of said third separated luma response comprises:

a first cross-fader for combining said first and second separated luma responses in proportions responsive to said second output signal from said correlator means, to thereby generate a first cross-fader output signal.

12. An adaptive luma/chroma separator as set forth in claim 11, wherein said means for controlling the ratio between said horizontal peaking signal and said vertical peaking signal as components of said third separated luma response comprises:

a second cross-fader for combining said horizontal and vertical peaking signals in proportions responsive to said second output signal from said correlator means, to thereby generate a second cross-fader output signal.

13. An adaptive luma/chroma separator as set forth in claim 12 wherein said means for generating a third separated luma response further includes:

means for coring noise from said second cross-fader output signal to generate a cored peaking signal;

means for delaying said first cross-fader output signal to compensate for delay in said cored peaking signal, as caused at least in part by delay through one or both of said band-pass peaking filter means and said low-pass peaking filter means, thereby to generate a compensatingly delayed first cross-fader output signal; and means for admixing in controlled ratio said cored peaking signal with said compensatingly delayed first cross-fader output signal.

14. An adaptive luma/chroma separator as set forth in claim 12, wherein said correlator means comprises:
- a horizontal scan edge detector, determining the absolute value of differences between said variously delayed composite video signals descriptive of left and right pixels in said middle row of said square array of nine contiguous pixels, for generating a horizontal scan edge detection response;
- a vertical scan edge detector, determining the absolute value of differences between said variously delayed composite video signals descriptive of top and bottom pixels in said middle column of said square array of nine contiguous pixels, for generating a vertical scan edge detection response; and
- means for subtractively combining said horizontal scan edge detection response and said vertical scan edge detection response to generate a difference signal as said second output signal of said correlator means.

15. An adaptive luma/chroma separator as set forth in claim 12, wherein the pixels in the top row of said square array are identified from left to right as c, b and a, respectively; the pixels in the middle row of said square array are identified from left to right as f, e and d, respectively; and the pixels in the bottom row of said square array are identified from left to right as i, h and g, respectively; and wherein said correlator means comprises:
- a horizontal scan edge detector combining signals at points a, c, d, f, g and i with weights in $(-\frac{1}{4}):(\frac{1}{4}):(-\frac{1}{2}):(\frac{1}{2}):(-\frac{1}{4}):(\frac{1}{4})$ ratio for generating a horizontal scan edge detection response;
- a vertical scan edge detector combining signals at points a, b, c, g, h and i with weights in $(-\frac{1}{4}):(-\frac{1}{2}):(-\frac{1}{4}):(\frac{1}{4}):(\frac{1}{2}):(\frac{1}{4})$: ratio for generating a vertical scan edge detection response; and
- means for generating said second output signal from said correlator means as a differential response to the absolute values of said horizontal scan edge detection response and of said vertical scan edge detection response.

16. An adaptive luma/chroma separator as set forth in claim 12, wherein the pixels in the top row of said square array are identified from left to right as c, b and a, respectively; the pixels in the middle row of said square array are identified from left to right as f, e and d, respectively; and the pixels in the bottom row of said square array are identified from left to right as i, h and g, respectively; and wherein said correlator means comprises:
- a horizontal scan edge detector combining signals at points a, b, c, d, e, f, g, h and i with weights in $(-1/16):(\frac{1}{8}):(-1/16):(-\frac{1}{8}):(\frac{1}{4}):(-\frac{1}{8}):(-1/16):(\frac{1}{8}):(-1/16)$ ratio for generating a horizontal scan edge detection response;
- a vertical scan edge detector combining signals at points a, b, c, d, e, f, g, h and i with weights in $(-1/16):(-\frac{1}{8}):(-1/16):(\frac{1}{8}):(\frac{1}{4}):(\frac{1}{8}):(-1/16):(-\frac{1}{8}):(-1/16)$ ratio for generating a vertical scan edge detection response; and
- means for generating said second output signal from said correlator means as a differential response to the absolute values of said horizontal scan edge detection response and of said vertical scan edge detection response.

17. An adaptive luma/chroma separator as set forth in any one of claims 14, 15 and 16, including:
- means for providing an indication of the polarity of said second output signal from said correlator means as said first output signal from said correlator means; and
- a multiplexer in said means for generating a third separated chroma response, said mutiplexer responding to said first output signal from said correlator means indicating said horizontal scan edge detection response exceeds said vertical scan edge detection response for generating said third separated chroma response in sole response to said first separated chroma response, and said mutiplexer responding to said first output signal from said correlator means indicating said vertical scan edge detection response exceeds said horizontal scan edge detection response for generating said third separated chroma response in sole response to said second separated chroma response.

18. An adaptive luma/chroma separator as set forth in any one of claims 14, 15, and 16, wherein said first output signal from said correlator means corresponds with said second output signal from said correlator means said adaptive luma/chroma separator includes:
- a third cross-fader included in said means for generating a third separated chroma response, said third cross-fader responding to said first output signal from said correlator means indicating said horizontal scan edge detection response exceeds said vertical scan edge detection response for generating said third separated chroma response in greater response to said first separated chroma response than to said second separated chroma response, and said third cross-fader responding to said first output signal from said correlator means indicating said vertical scan edge detection response exceeds said horizontal scan edge detection response for generating said third separated chroma response in greater response to said second separated chroma response than to said first separated chroma response.

19. An adaptive luma/chroma separator as set forth in any one of claims 14, 15 and 16, wherein said means for generating a third separated luma response includes:
- a read-only memory storing a look-up table addressed by said second output signal from said correlator means, for generating a control signal;
- means for supplying the one's complement of said control signal simultaneously therewith;
- within said first cross-fader, first and second digital multipliers receptive of separate ones of said first and second separated luma responses as respective multiplicand signals, said first digital multiplier being supplied said control signal as a respective multiplier signal and supplying a respective product signal, said second digital multiplier being supplied the one's complement of said control signal and supplying a respective product signal;
- within said first cross-fader, means linearly and constructively combining the respective product signals of said first and second digital multipliers for generating said first cross-fader output signal;
- within said second cross-fader, third and fourth digital multipliers receptive of separate ones of said horizontal and vertical peaking signals as respective multiplicand signals, said third digital multiplier being supplied said control signal as a respective multiplier signal and supplying a respective product signal, said fourth digital multiplier being supplied the one's complement of said control signal and supplying a respective product signal; and within said second cross-fader, means linearly and constructively combining the respective product signals of said third and fourth digital multipliers for generating said second cross-fader output signal.

20. An adaptive luma/chroma separator as set forth in claim 19, comprising:

means for providing an indication of the polarity of said second output signal from said correlator means as said first output signal from said correlator means; and a multiplexer in said means for generating a third separated chroma response, said multiplexer responding to said first output signal from said correlator means indicating said horizontal scan edge detection response exceeds said vertical scan edge detection response for generating said third separated chroma response in sole response to said first separated chroma response, and said multiplexer responding to said first output signal from said correlator means indicating said vertical scan edge detection response exceeds said horizontal scan edge detection response for generating said third separated chroma response in sole response to said second separated chroma response.

21. An adaptive luma/chroma separator as set forth in claim 19, wherein said first output signal from said correlator means corresponds with said second output signal from said correlator means, said adaptive luma/chroma separator includes:

a third cross-fader included in said means for generating a third separated chroma response, said third cross-fader responding to said first output signal from said correlator means indicating said horizontal scan edge detection response exceeds said vertical scan edge detection response for generating said third separated chroma response in greater response to said first separated chroma response than to said second separated chroma response, and said third cross-fader responding to said first output signal from said correlator means indicating said vertical scan edge detection response exceeds said horizontal scan edge detection response for generating said third separated chroma response in greater response to said second separated chroma response than to said first separated chroma response.

22. An adaptive luma/chroma separator as set forth in any of claims 14, 15 and 16, wherein said means for generating a third separated luma response includes:

a read-only memory storing a look-up table addressed by said second output signal from said correlator means, for generating a control signal;

means for supplying the one's complement of said control signal simultaneously therewith;

within said first cross-fader, first and second digital multipliers receptive of separate ones of said first and second separated luma responses as respective multiplicand signals, said first digital multiplier being supplied said control signal as a respective multiplier signal and supplying a respective product signal, said second digital multiplier being supplied said one's complement of said control signal and supplying a respective product signal;

within said first cross-fader, means linearly and constructively combining the respective product signals of said first and second digital multipliers for generating output signal for said first cross-fader;

within said second cross-fader, third and fourth digital multipliers receptive of separate ones of said horizontal and vertical peaking signals as respective multiplicand signals, said third digital multiplier being supplied said control signal as a respective multiplier signal and supplying a respective product signal, said fourth digital multiplier being supplied said one's complement of said control signal and supplying a respective product signal;

within said second cross-fader, means linearly and constructively combining the respective product signals of said third and fourth digital multipliers for generating output signal for said second cross-fader;

means for coring noise from said second cross-fader output signal to generate a cored peaking signal;

means for delaying said first cross-fader output signal to compensate for delay in said cored peaking signal, as caused at least in part by delay through one or both of said band-pass peaking filter means and said low-pass peaking filter means, thereby to generate a compensatingly delayed first cross-fader output signal; and means for admixing in controlled ratio said cored peaking signal with said compensatingly delayed first cross-fader output signal.

23. An adaptive luma/chroma separator for separating luminance and chrominance components of a composite video signal, said composite video signal describing line-by-line scanning of successive image fields and exhibiting changing relative degrees of horizontal correlation and vertical correlation of a picture element currently being scanned and its locally surrounding picture elements said adaptive luma/chroma separator providing adaptive luminance peaking and comprising:

delay means including a plurality of delay elements connected for variously delaying said composite video signal, for providing variously delayed composite video signals generally being descriptive of the scanning of a square array of nine contiguous pixels within a currently scanned image field, said square array having top and middle and bottom rows of pixels arrayed along successive scan lines of said currently scanned image field, said square array having left and middle and right columns of pixels arrayed transversely to successive scan lines of said currently scanned image field;

means, combining in a bandpass vertical comb filtering procedure ones of said variously delayed composite video signals descriptive of pixels in said middle column of said square array of nine contiguous pixels, for generating a first separated chroma response;

means, combining in a bandpass horizontal comb filtering procedure ones of said variously delayed composite video signals descriptive of pixels in said middle row of said square array of nine contiguous pixels, for generating a second separated chroma response;

means, combining in a lowpass vertical comb filtering procedure ones of said variously delayed composite video signals descriptive of pixels in said middle column of said square array of nine contiguous pixels, for generating a first separated luma response;

means, combining in a lowpass horizontal comb filtering procedure ones of said variously delayed composite video signals descriptive of pixels in said middle row of said square array of nine contiguous pixels, for generating a second separated luma response;

low-pass peaking filter means responding to said first separated chroma response for separating only a vertical peaking signal;

band-pass peaking filter means responding to said first separated luma response for separating only a horizontal peaking signal;

means for supplying adjusted responses to said vertical and horizontal peaking signals, the adjusted response to said vertical peaking signal differing in signal strength from said vertical peaking signal by a factor within a range of factors that can include one, and the adjusted response to said horizontal peaking signal differing in signal strength from said horizontal peaking signal by said factor also;

means for combining said adjusted response to said horizontal peaking signal with suitably delayed said first separated luma response to generate a first peaked separated luma response;

means for combining said adjusted response to said vertical peaking signal with suitably delayed said second separated luma response to generate a second peaked separated luma response;

correlator means responding to ones of said variously delayed composite video signals for generating output signals representative of the relative degrees of said vertical correlation and said horizontal correlation within said square array of nine contiguous pixels;

means combining said first and second separated chroma responses in accordance with a first of said output signals from said correlator means for generating a third separated chroma response for ultimate use; and means combining said first and second peaked separated luma responses in accordance with a second of said output signals from said correlator means for generating a third peaked separated luma response for ultimate use.

24. An adaptive luma/chroma separator as set forth in claim 23, wherein said means for generating a third peaked separated luma response for ultimate use comprises:

a first cross-fader for combining said first and second output signal from said correlator means, to thereby generate a first cross-fader output signal.

25. An adaptive luma/chroma separator as set forth in claim 24, further including:

means for coring noise from said horizontal peaking signal before supplying said horizontal peaking signal to said means for supplying adjusted responses to said vertical and horizontal peaking signals; and means for coring noise from said vertical peaking signal before supplying said vertical peaking signal to said means for supplying adjusted responses to said vertical and horizontal peaking signals.

26. An adaptive luma/chroma separator as set forth in claim 23, wherein said correlator means comprises:

a horizontal scan edge detector, determining the absolute value of differences between said variously delayed composite video signals descriptive of left and right pixels in said middle row of said square array of nine contiguous pixels, for generating a horizontal scan edge detection response;

a vertical scan edge detector, determining the absolute value of differences between said variously delayed composite video signals descriptive of top and bottom pixels in said middle column of said square array of nine contiguous pixels, for generating a vertical scan edge detection response; and means for subtractively combining said horizontal scan edge detection response and said vertical scan edge detection response to generate said second output signal from said correlator means.

27. An adaptive luma/chroma separator as set forth in claim 23, wherein the pixels in the top row of said square array are identified from left to right as c, b and a, respectively; the pixels in the middle row of said square array are identified from left to right as f, e and d, respectively; and the pixels in the bottom row of said square array are identified from left to right as i, h and g, respectively; and wherein said correlator means comprises:

a horizontal scan edge detector combining signals at points a, c, d, f, g and i with weights in $(-\frac{1}{4}):(\frac{1}{4}):(-\frac{1}{2}):(\frac{1}{2}):(-\frac{1}{4}):(\frac{1}{4})$ ratio for generating a horizontal scan edge detection response;

a vertical scan edge detector combining signals at points a, b, c, g, h and i with weights in $(-\frac{1}{4}):(-\frac{1}{2}):(-\frac{1}{4}):(\frac{1}{4}):(\frac{1}{2}):(\frac{1}{4})$ ratio for generating a vertical scan edge detection response; and means for generating said second output signal from said correlator means as a differential response to the absolute values of said horizontal scan edge detection response and of said vertical scan edge detection response.

28. An adaptive luma/chroma separator as set forth in claim 23, wherein the pixels in the top row of said square array are identified from left to right as c, b and a, respectively; the pixels in the middle row of said square array are identified from left to right as f, e and d, respectively; and the pixels in the bottom row of said square array are identified from left to fight as i, h and g, respectively; and wherein said correlator means comprises:

a horizontal scan edge detector combining signals at points a, b, c, d, e, f, g, h and i with weights in $(-1/16):(\frac{1}{8}):(-1/16)(-\frac{1}{8}):(\frac{1}{4}):(-\frac{1}{8}):(-1/16):(\frac{1}{8}):(-1/16)$ ratio for generating a horizontal scan edge detection response;

a vertical scan edge detector combining signals at points a, b, c, d, e, f, g, h and i with weights in $(-1/16):(-\frac{1}{8}):(-1/16):(\frac{1}{8}):(\frac{1}{4}):(\frac{1}{8}):(-1/16):(-\frac{1}{8}):(-1/16)$ ratio for generating a vertical scan edge detection response; and means for generating said second output signal from said correlator means as a differential response to the absolute values of said horizontal scan edge detection response and of said vertical scan edge detection response.

29. An adaptive luma/chroma separator as set forth in any one of claims 26, 27 and 28, including:

means for providing an indication of the polarity of said second output signal from said correlator means as said first output signal from said correlator means; and a multiplexer in said means for generating a third separated chroma response, said mutiplexer responding to said first output signal from said correlator means indicating said horizontal scan edge detection response exceeds said vertical scan edge detection response for generating said third separated chroma response in sole response to said first separated chroma response, and said mutiplexer responding to said first output signal from said correlator means indicating said vertical scan edge detection response exceeds said horizontal scan edge detection response for generating said third separated chroma response in sole response to said second separated chroma response.

30. An adaptive luma/chroma separator as set forth in claim 29, wherein said means for generating a third peaked separated luma response includes:
a read-only memory storing a look-up table addressed by said second output signal from said correlator means, for generating a control signal;
means for supplying the one's complement of said control signal simultaneously therewith; and
a first cross fader including a first digital multiplier receptive of said first peaked separated luma response as a respective multiplicand signal, a second digital multiplier receptive of said second peaked separated luma response as a respective multiplicand signal, and means linearly and constructive combining respective product signals from said first and second digital multipliers for generating said third peaked separated luma response, said first digital multiplier being supplied said control signal as said respective multiplicand signal, and said second digital multiplier being supplied said one's complement of said control signal as said respective multiplicand signal.

31. An adaptive luma/chroma separator as set forth in claim 23, including:
means for providing an indication of the polarity of said second output signal from said correlator means as said first output signal from said correlator means; and
a multiplexer in said means for generating a third separated chroma response, said mutiplexer responding to said first output signal from said correlator means indicating said horizontal scan edge detection response exceeds said vertical scan edge detection response for generating said third separated chroma response in sole response to said first separated chroma response, and said mutiplexer responding to said first output signal from said correlator means indicating said vertical scan edge detection response exceeds said horizontal scan edge detection response for generating said third separated chroma response in sole response to said second separated chroma response.

32. An adaptive luma/chroma separator as set forth in claim 23, further including:
a cross-fader included in said means for generating a third separated chroma response, said cross-fader responding to said first output signal from said correlator means indicating said horizontal scan edge detection response exceeds said vertical scan edge detection response for generating said third separated chroma response in greater response to said first separated chroma response than to said second separated chroma response, and said cross-fader responding to said first output signal from said correlator means indicating said vertical scan edge detection response exceeds said horizontal scan edge detection response for generating said third separated chroma response in greater response to said second separated chroma response than to said first separated chroma response.

33. An adaptive luma/chroma separator as set forth in any of claims 26, 27 and 28 further comprising:
a read-only memory storing a look-up table addressed by said second output signal from said correlator means, for generating a control signal;
means for supplying the one's complement of said control signal simultaneously therewith;
within said means for generating a third peaked separated luma response, first and second digital multipliers receptive of separate ones of said first and second separated luma responses as respective multiplicand signals, said first digital multiplier being supplied said control signal as a respective multiplier signal and supplying a respective product signal, said second digital multiplier being supplied said one's complement of said control signal and supplying a respective product signal;
within said means for generating a third peaked separated luma response, means linearly and constructively combining the respective product signals of said first and second digital multipliers for generating said third peaked separated luma response;
within said means for generating a third separated chroma response, third and fourth digital multipliers receptive of separate ones of said horizontal and vertical peaking signals as respective multiplicand signals, said third digital multiplier being supplied said control signal as a respective multiplier signal and supplying a respective product signal, said fourth digital multiplier being supplied said one's complement of said control signal and supplying a respective product signal; and
within said means for generating a third separated chroma response, means linearly and constructively combining the respective product signals of said third and fourth digital multipliers for generating said third separated chroma response.

34. An adaptive chroma separator for separating chrominance components of a composite video signal, said composite video signal describing line by line scanning of successive image fields and exhibiting changing relative degrees of horizontal correlation and vertical correlation of a picture element currently being scanned and its locally surrounding picture elements said adaptive chroma separator comprising:
delay means including a plurality of delay elements connected for variously delaying said composite video signal, for providing variously delayed composite video signals generally being descriptive of the scanning of a square array of nine contiguous pixels within a currently scanned image field, said square array having top and middle and bottom rows of pixels arrayed along successive scan lines of said currently scanned image field, said square array having left and middle and right columns of pixels arrayed transversely to successive scan lines of said currently scanned image field;
means, combining in a bandpass vertical comb filtering procedure ones of said variously delayed composite video signals descriptive of pixels in said middle column of said square array of nine contiguous pixels, for generating a first separated chroma response;

means, combining in a bandpass horizontal comb filtering procedure ones of said variously delayed composite video signals descriptive of pixels in said middle row of said square array of nine contiguous pixels, for generating a second separated chroma response;

correlator means responding to ones of said variously delayed composite video signals for generating at least a first output signal representative of the relative degrees of said vertical correlation and said horizontal correlation within said square array of nine contiguous pixels; and means, combining said first and second separated chroma responses in accordance with said first output signal from said correlator means, for generating a third separated chroma response for ultimate use, said means for generating a third separated chroma response including:

means for controlling over a range of values more than two, responsive to said first output signal from said correlator means, the ratio between said first separated chroma response and said second separated chroma response as components of said third separated chroma response, said range of values including a value in which the ratio between said first separated chroma response and said second separated chroma response as components of said third separated chroma response is substantially 1:1.

35. An adaptive chroma separator as set forth in claim 34, wherein said means for controlling the ratio between said first separated chroma response and said second separated chroma response as components of said third separated chroma response comprises:

a cross-fader for combining said first and second separated chroma responses in proportions responsive to said output signal from said correlator means, thereby to generate said third separated chroma response.

36. An adaptive chroma separator as set forth in claim 35 wherein said means for controlling the ratio between said first separated chroma response and said second separated chroma response as components of said third separated chroma response includes:

a read-only memory storing a look-up table addressed by said first output signal from said correlator means, for generating a control signal;

means for supplying the one's complement of said control signal simultaneously therewith;

within said cross-fader, first and second digital multipliers receptive of separate ones of said first and second separated chroma responses as respective multiplicand signals, said first digital multiplier being supplied said control signal as a respective multiplier signal and supplying a respective product signal, said second digital multiplier being supplied said one's complement of said control signal and supplying a respective product signal;

within said cross-fader, means linearly and constructively combining the respective product signals of said first and second digital multipliers for generating said third separated chroma response.

37. An adaptive chroma separator as set forth in claim 34, wherein said correlator means comprises:

a horizontal scan edge detector, determining the absolute value of differences between said variously delayed composite video signals descriptive of left and right pixels in said middle row of said square array of nine contiguous pixels, for generating a horizontal scan edge detection response;

a vertical scan edge detector, determining the absolute value of differences between said variously delayed composite video signals descriptive of top and bottom pixels in said middle column of said square array of nine contiguous pixels, for generating a vertical scan edge detection response; and means for subtractively combining said horizontal scan edge detection response and said vertical scan edge detection response to generate a difference signal that determines said first output signal of said correlator means.

38. An adaptive chroma separator as set forth in claim 34, wherein the pixels in the top row of said square array are identified from left to right as c, b and a, respectively; the pixels in the middle row of said square array are identified from left to right as f, e and d, respectively; and the pixels in the bottom row of said square array are identified from left to right as i, h and g, respectively; and wherein said correlator means comprises:

a horizontal scan edge detector combining signals at points a, c, d, f, g and i with weights in $(-\frac{1}{4}):(\frac{1}{4}):(-\frac{1}{2}):(\frac{1}{2}):(-\frac{1}{4}):(\frac{1}{4})$ ratio for generating a horizontal scan edge detection response;

a vertical scan edge detector combining signals at points a, b, c, g, h and i with weights in $(-\frac{1}{4}):(-\frac{1}{2}):(-\frac{1}{4}):(\frac{1}{4}):(\frac{1}{2}):(\frac{1}{4})$ ratio for generating a vertical scan edge detection response; and means for generating a differential response to the absolute values of said horizontal scan edge detection response and of said vertical scan edge detection response, which differential response determines said first output signal of said correlator means.

39. An adaptive chroma separator as set forth in claim 34, wherein the pixels in the top row of said square array are identified from left to right as c, b and a, respectively; the pixels in the middle row of said square array are identified from left to right as f, e and d, respectively; and the pixels in the bottom row of said square array are identified from left to right as i, h and g, respectively; and wherein said correlator means comprises:

a horizontal scan edge detector combining signals at points a, b, c, d, e, f, g, h and i with weights in $(-1/16):(\frac{1}{8}):(-1/16):(-\frac{1}{8}):(\frac{1}{4}):(-\frac{1}{8}):(-1/16):(\frac{1}{8}):(-1/16)$ ratio for generating a horizontal scan edge detection response;

a vertical scan edge detector combining signals at points a, b, c, d, e, f, g, h and i with weights in $(-1/16):(-\frac{1}{8}):(-1/16):(\frac{1}{8}):(\frac{1}{4}):(\frac{1}{8}):(-1/16):(-\frac{1}{8}):(-1/16)$ ratio for generating a vertical scan edge detection response; and means for generating a differential response to the absolute values of said horizontal scan edge detection response and of said vertical scan edge detection response, which differential response determines said first output signal of said correlator means.

40. An adaptive luma/chroma separator as set forth in either of claims 12 or 13, wherein said means for generating a third separated luma response includes:

a read-only memory storing a look-up table addressed by said second output signal from said correlator means, for generating a control signal;

means for supplying the one's complement of said control signal simultaneously therewith;

within said first cross-fader, first and second digital multipliers receptive of separate ones of said first and second separated luma responses as respective multiplicand signals, said first digital multiplier being supplied said control signal as a respective multiplier signal and supplying a respective product signal, said second digital multiplier being supplied said one's complement of said control signal and supplying a respective product signal;

within said first cross-fader, means linearly and constructively combining the respective product signals of said first and second digital multipliers for generating said first cross-fader output signal;

within said second cross-fader, third and fourth digital multipliers receptive of separate ones of said horizontal and vertical peaking signals as respective multiplicand signals, said third digital multiplier being supplied said control signal as a respective multiplier signal and supplying a respective product signal, said fourth digital multiplier being supplied the one's complement of said control signal and supplying a respective product signal; and within said second cross-fader, means linearly and constructively combining the respective product signals of said third and fourth digital multipliers for generating said second cross-fader output signal.

41. An adaptive luma/chroma separator its set forth in any one of claims 23, 26, 27 and 28, wherein said means for generating a third peaked separated luma response includes:

a read-only memory storing a look-up table addressed by said second output signal from said correlator means, for generating a control signal;

means for supplying the one's complement of said control signal simultaneously therewith; and a first cross-fader including a first digital multiplier receptive of said first peaked separated luma response as a respective multiplicand signal, a second digital multiplier receptive of said second peaked separated luma response as a respective multiplicand signal, and means linearly and constructively combining respective product signals from said first and second digital multipliers for generating said third peaked separated luma response, said first digital multiplier being supplied said control signal as said respective multiplicand signal, and said second digital multiplier being supplied said one's complement of said control signal as said respective multiplicand signal.

42. An adaptive luma/chroma separator as set forth in claim 41, including:

means for providing an indication of the polarity of said second output signal from said correlator means as said first output signal from said correlator means; and a multiplexer in said means for generating a third separated chroma response, said mutiplexer responding to said first output signal from said correlator means indicating said horizontal scan edge detection response exceeds said vertical scan edge detection response for generating said third separated chroma response in sole response to said first separated chroma response, and said mutiplexer responding to said first output signal from said correlator means indicating said vertical scan edge detection response exceeds said horizontal scan edge detection response for generating said third separated chroma response in sole response to said second separated chroma response.

43. An adaptive luma/chroma separator as set forth in claim 41, including:

a second cross-fader included in said means for generating a third separated chroma response, said second cross-fader responding to said first output signal from said correlator means indicating said horizontal scan edge detection response exceeds said vertical scan edge detection response for generating said third separated chroma response in greater response to said first separated chroma response than to said second separated chroma response, and said second cross-fader responding to said first output signal from said correlator means indicating said vertical scan edge detection response exceeds said horizontal scan edge detection response for generating said third separated chroma response in greater response to said second separated chroma response than to said first separated chroma response.

* * * * *